(12) United States Patent
Justinski et al.

(10) Patent No.: US 12,539,593 B2
(45) Date of Patent: Feb. 3, 2026

(54) BEARING DEVICE FOR AN ACCUMULATOR MODULE ON A HANDHELD TOOL

(71) Applicant: C. & E. Fein GmbH, Schwaebisch Gmuend-Bargau (DE)

(72) Inventors: Klaus Justinski, Schechingen (DE); Olaf Klabunde, Giengen an der Brenz (DE)

(73) Assignee: C. & E. Fein GmbH, Schwaebisch Gmuend-Bargau (DE)

( * ) Notice: Subject to any disclaimer, the term of this patent is extended or adjusted under 35 U.S.C. 154(b) by 0 days.

(21) Appl. No.: 18/372,504

(22) Filed: Sep. 25, 2023

(65) Prior Publication Data

US 2024/0100680 A1    Mar. 28, 2024

(30) Foreign Application Priority Data

Sep. 23, 2022 (EP) ..................... 22197482

(51) Int. Cl.
*B25F 5/02* (2006.01)

(52) U.S. Cl.
CPC ..................... *B25F 5/02* (2013.01)

(58) Field of Classification Search
CPC .................................. B25F 5/02; Y02E 60/10
USPC ........ 173/197, 81, 90, 140–141, 162.1, 198, 173/213–217, 168–171
See application file for complete search history.

(56) References Cited

U.S. PATENT DOCUMENTS

| | | | | |
|---|---|---|---|---|
| 4,160,857 A | * | 7/1979 | Nardella | H01M 50/213 429/97 |
| 4,682,751 A | * | 7/1987 | Tamas | B60R 16/04 180/68.5 |
| 4,871,629 A | * | 10/1989 | Bunyea | B25F 5/02 292/341.15 |
| 4,955,984 A | * | 9/1990 | Cuevas | B23Q 11/0053 408/72 R |
| 5,169,225 A | * | 12/1992 | Palm | B25F 5/021 362/118 |

(Continued)

FOREIGN PATENT DOCUMENTS

| | | |
|---|---|---|
| DE | 10124537 A1 | 2/2002 |
| DE | 102015204044 A1 | 9/2016 |

(Continued)

*Primary Examiner* — Robert F Long
(74) *Attorney, Agent, or Firm* — Muncy, Geissler, Olds & Lowe, P.C.

(57) ABSTRACT

A bearing device for supporting an accumulator module on an interface of a power tool housing section of a handheld tool and a corresponding accumulator housing section of the accumulator module, including at least one bearing element, which is designed to captively support the accumulator module in a connection position, in which the accumulator module is electrically connected to the handheld tool, and to permit the transfer of the accumulator module from the connection position into a removal position, in which the accumulator module may be removed from the handheld tool. The at least one bearing element includes a polymer and is arranged between the power tool housing section and the accumulator housing section in the connection position for the purpose of supporting the power tool housing section and the accumulator housing section.

18 Claims, 5 Drawing Sheets

(56) References Cited

U.S. PATENT DOCUMENTS

| | | | | |
|---|---|---|---|---|
| 5,278,002 | A * | 1/1994 | Hiers | H01M 10/613 |
| | | | | 429/177 |
| 5,878,607 | A * | 3/1999 | Nunes | B23D 47/12 |
| | | | | 30/124 |
| 6,095,713 | A * | 8/2000 | Doyle | F16B 7/04 |
| | | | | 403/103 |
| 6,230,834 | B1 * | 5/2001 | Van Hout | B60R 16/04 |
| | | | | 180/68.5 |
| 6,451,017 | B1 * | 9/2002 | Moutafis | A61B 17/32037 |
| | | | | 604/35 |
| 6,575,590 | B1 * | 6/2003 | Wadsworth | B25F 5/021 |
| | | | | 362/120 |
| 6,641,634 | B2 * | 11/2003 | Reich | B23Q 11/0046 |
| | | | | 173/75 |
| 6,648,090 | B2 * | 11/2003 | Iwase | B60K 1/04 |
| | | | | 180/68.5 |
| 6,656,626 | B1 | 12/2003 | Mooty et al. | |
| D485,382 | S * | 1/2004 | Palm | D26/38 |
| 6,876,173 | B2 * | 4/2005 | Mastaler | H02J 7/0045 |
| | | | | 320/114 |
| 6,921,285 | B2 * | 7/2005 | Glauning | H01M 50/296 |
| | | | | 439/500 |
| 6,965,214 | B2 * | 11/2005 | Kubale | H02J 7/0044 |
| | | | | 320/114 |
| 7,014,945 | B2 * | 3/2006 | Moores, Jr. | H01M 10/6556 |
| | | | | 429/71 |
| 7,217,069 | B2 * | 5/2007 | Dils | G01V 3/15 |
| | | | | 324/67 |
| 7,331,559 | B2 * | 2/2008 | Hirayu | B60R 16/04 |
| | | | | 180/68.5 |
| 7,501,198 | B2 * | 3/2009 | Barlev | H01M 50/262 |
| | | | | 429/96 |
| 8,132,296 | B2 * | 3/2012 | Di Nicolantonio | B25F 5/026 |
| | | | | 16/426 |
| 8,517,131 | B2 * | 8/2013 | Kovach | H01M 50/249 |
| | | | | 180/68.5 |
| 8,695,725 | B2 * | 4/2014 | Lau | B25F 5/02 |
| | | | | 173/171 |
| 8,944,401 | B2 * | 2/2015 | Guest | F16F 15/08 |
| | | | | 248/500 |
| 10,005,350 | B1 * | 6/2018 | Khan | B60K 1/04 |
| 10,483,510 | B2 * | 11/2019 | Stephens | H01M 50/249 |
| 11,084,006 | B2 * | 8/2021 | Carlson | B01J 27/13 |
| 11,417,923 | B2 * | 8/2022 | Fukutome | H01M 10/653 |
| 11,931,840 | B2 * | 3/2024 | Machida | B23Q 11/0046 |
| 2002/0152731 | A1 * | 10/2002 | Reich | B23Q 11/0046 |
| | | | | 55/385.1 |
| 2003/0149424 | A1 * | 8/2003 | Barlev | H01M 50/262 |
| | | | | 606/1 |
| 2004/0251041 | A1 * | 12/2004 | Grossman | B23Q 37/00 |
| | | | | 173/217 |
| 2005/0153596 | A1 * | 7/2005 | VanWambeke | H01R 31/06 |
| | | | | 439/500 |
| 2005/0267776 | A1 * | 12/2005 | Selby | B25F 5/00 |
| | | | | 705/26.1 |
| 2006/0228936 | A1 * | 10/2006 | Chen | B25F 5/02 |
| | | | | 439/500 |
| 2007/0069153 | A1 * | 3/2007 | Pai-Paranjape | H01M 6/5066 |
| | | | | 250/461.1 |
| 2007/0227310 | A1 * | 10/2007 | Roehm | B25B 21/00 |
| | | | | 173/2 |
| 2008/0135272 | A1 * | 6/2008 | Wallgren | H01M 50/202 |
| | | | | 173/217 |
| 2009/0246608 | A1 * | 10/2009 | Wu | B25F 5/02 |
| | | | | 361/747 |
| 2011/0147031 | A1 * | 6/2011 | Matthias | B25F 5/02 |
| | | | | 173/171 |
| 2011/0197389 | A1 * | 8/2011 | Ota | H02J 7/007182 |
| | | | | 429/121 |
| 2012/0171529 | A1 * | 7/2012 | Sugita | H01M 10/623 |
| | | | | 429/62 |
| 2012/0171539 | A1 * | 7/2012 | Rejman | B25F 5/006 |
| | | | | 429/100 |
| 2013/0149581 | A1 * | 6/2013 | Yoshikawa | B25F 5/006 |
| | | | | 429/100 |
| 2014/0326477 | A1 * | 11/2014 | Thorson | B25F 5/006 |
| | | | | 173/171 |
| 2015/0104250 | A1 * | 4/2015 | Tada | H01M 50/247 |
| | | | | 403/375 |
| 2015/0132988 | A1 * | 5/2015 | Burger | B25F 5/00 |
| | | | | 439/374 |
| 2015/0165614 | A1 * | 6/2015 | Frenken | B25F 5/00 |
| | | | | 173/171 |
| 2016/0311094 | A1 * | 10/2016 | Mergener | B25B 23/1475 |
| 2018/0126534 | A1 * | 5/2018 | Iida | B25D 11/12 |
| 2018/0243895 | A1 * | 8/2018 | Frenken | B25F 5/00 |
| 2018/0250804 | A1 * | 9/2018 | Hoche | A01G 3/053 |
| 2019/0001477 | A1 * | 1/2019 | Ullrich | B25D 17/043 |
| 2019/0030622 | A1 * | 1/2019 | Carlson | B25F 5/026 |
| 2019/0058171 | A1 * | 2/2019 | Rejman | H01M 10/00 |
| 2019/0111551 | A1 * | 4/2019 | Kato | B25B 21/02 |
| 2020/0094329 | A1 * | 3/2020 | Meixner | H01M 50/247 |
| 2020/0405292 | A1 * | 12/2020 | Shelton, IV | H01M 10/488 |
| 2021/0237249 | A1 * | 8/2021 | Fischer | B25F 5/02 |
| 2021/0367305 | A1 * | 11/2021 | Wrobel | H01M 50/247 |
| 2021/0391733 | A1 * | 12/2021 | Douglas | H02J 7/0044 |
| 2022/0389727 | A1 * | 12/2022 | Ebisawa | E04G 21/08 |
| 2023/0021944 | A1 * | 1/2023 | Petrus | H01M 50/242 |
| 2023/0089745 | A1 * | 3/2023 | Bryan | H01M 50/583 |
| | | | | 429/72 |
| 2023/0147667 | A1 * | 5/2023 | Heinen | H01M 50/213 |
| | | | | 439/248 |
| 2023/0246516 | A1 * | 8/2023 | Duncan | B25F 5/02 |
| | | | | 173/162.1 |
| 2023/0347493 | A1 * | 11/2023 | Donapudi | B25F 5/02 |
| 2023/0415326 | A1 | 12/2023 | Monroy Aripez et al. | |
| 2024/0030557 | A1 * | 1/2024 | Hodge | H01M 50/553 |
| 2024/0347286 | A1 * | 10/2024 | Abbott | G10L 15/22 |

FOREIGN PATENT DOCUMENTS

| | | | | |
|---|---|---|---|---|
| DE | 102015221685 A1 * | 5/2017 | | B25D 17/00 |
| DE | 102017109919 A1 * | 11/2018 | | |
| EP | 3653340 A1 * | 5/2020 | | B25F 5/006 |
| EP | 3974115 A1 * | 3/2022 | | B25F 5/02 |
| GB | 2432036 A * | 5/2007 | | H01M 50/247 |
| JP | 2009262296 A * | 11/2009 | | |
| WO | WO-2004073005 A1 * | 8/2004 | | H01H 9/06 |
| WO | WO2022089873 A1 | 5/2022 | | |
| WO | WO-2024104765 A1 * | 5/2024 | | B25F 5/02 |

* cited by examiner

BEARING DEVICE FOR AN ACCUMULATOR MODULE ON A HANDHELD TOOL

This nonprovisional application claims priority under 35 U.S.C. § 119(a) to European Patent Application No. 22197482.7, which was filed in Europe on Sep. 23, 2022, and which is herein incorporated by reference.

BACKGROUND OF THE INVENTION

Field of the Invention

The present invention relates to a bearing device for supporting an accumulator module on an interface of a power tool housing section of a handheld tool and a corresponding accumulator housing section of the accumulator module, a power tool housing section including a bearing device of this type, an accumulator housing section including a bearing device of this type, and a handheld tool including a bearing device of this type, in particular a handheld tool with an oscillating driving movement.

Description of the Background Art

In accumulator-driven electric tools with vibrations occurring during operation, in particular when the movement of the tool is based on an oscillating movement, the accumulator module may fuse to the power tool at the contact points, due to the heat generated by friction. The quality of the surfaces of the contact points is crucial. The cleaner the surfaces, the faster does an undesirable plastic fusing connection occur between the housings of the power tool and the accumulator module. As a result, the accumulator module may no longer be removed, or only by applying high forces and possibly not in a nondestructive manner. Material damage and fatigue also result.

One possibility for avoiding the plastic fusion is to wax the accumulator module in the regions corresponding to the power tool housing. Wax is applied to the guide and the contact points of the accumulator interface on the accumulator module with the aid of a device for the purpose of intentionally soiling them. It has been demonstrated that this measure is an effective option, which, however, is only of short duration, since the wax evaporates. Depending on the use of the handheld tool during operation, the fact that the contact surfaces remain permanently covered by the wax is not ensured. The establishment of a materially bonded connection by waxing the contact surfaces may therefore be prevented only for a short time.

Another possibility has been seen in using metal clamps and providing a greater clearance between the accumulator module and power tool housing in the guide. The metal clamps were arranged in a region in which a pushbutton latch of the accumulator module engages when the accumulator module is pushed in. The metal clamps formed a more stable friction surface at this point, compared to the plastic surrounding the metal clamps. However, it was determined that the plastic pushbutton latch became damaged over time, due to the vibration at the edge of the metal clamps during operation, and, as a result, the accumulator module may no longer be reliably unlocked.

SUMMARY OF THE INVENTION

It is therefore an object of the invention to prevent a materially bonded connection between the power tool housing and the accumulator module housing in a handheld tool driven in an oscillating manner.

This object is achieved by a bearing device, in particular by a power tool machine section provided therewith or an accumulator housing section.

In an example, the bearing device can be used to support an accumulator module on an interface of a power tool housing section of a handheld tool and a corresponding accumulator housing section of the accumulator module. The bearing device includes at least one bearing element, which is designed to captively support the accumulator module in a connection position, in which the accumulator module is electrically connected to the handheld tool.

The bearing element further permits the accumulator module to be transferred from the connection position to a removal position, in which the accumulator module may be removed from the handheld tool. The at least one bearing element includes a polymer and is arranged between the power tool housing section and the accumulator housing section in the connection position for the purpose of supporting the power tool housing section and the accumulator housing section. The bearing device permits an indirect support of the accumulator housing section on the power tool housing section, which reduces the risk of a fusing of the two sections supported indirectly against each other.

A bearing device can be understood to be a device which is functionally designed to support a component and to reversibly limit its movement in the connection position in some degrees of freedom, preferably in all degrees of freedom. This component supported in the connection position is, in particular, the accumulator housing section. The bearing device may be fixedly connected to the power tool housing section or to the accumulator housing section.

The bearing device may be present in the form of a one-part, preferably two-part, or a multi-part device. These multiple parts may be connected to each other and/or they may touch each other in the connection position, in which the accumulator module is electrically connected to the handheld tool. Furthermore, the bearing device may also be present in the form of multiple structurally non-cohesive components, which, however, interact with each other for the purpose of support, preferably by achieving a multipoint support effectuated in the connection position, in particular a three-point support or four-point support. In such cases, it is possible that further support points exist in the connection position, which are not formed by the bearing device; however, the support of the accumulator housing section on the power tool housing section is formed exclusively by the bearing device in the case of the multipoint support and in all other cases. Single-point bearings in this sense may be formed, in particular, by bearing elements designed as socket elements. These socket elements may have receiving regions for receiving engagement regions, in particular in a form-fitting manner. These engagement regions are then formed, in particular, on the power tool housing section. These socket elements may conversely also have engagement regions for engagement, in particular form-fitting engagement, with receiving regions. These receiving regions are then formed, in particular, on the power tool housing section.

The power tool housing section and the accumulator housing section are preferably at least partially, in particular completely, supported at a distance from each other. The support completely at a distance results in that the power tool housing section and the accumulator housing section do not touch each other in the connection position. The partially spaced-apart support takes into consideration the fact that the power tool housing section and the accumulator housing section touch each other in sections, in particular at sections where the problem of fusing does not occur or is negligible in practice. As a result of the spacing apart, little, preferably no, contact occurs between the accumulator housing section and the power tool housing section in the connection position. The rubbing of the two sections against each other induced by the oscillation is reduced thereby, preferably avoided entirely, and the cause of the heat development is hindered. As a result, an undesirable plastic fusing connection is prevented.

One bearing element, preferably two bearing elements, preferably each have an elongated shape, at least in sections or essentially. The implementation of a guiding function is made possible thereby.

An accumulator module can be understood to be a rechargeable storage element for the storage and defined emission of electrical energy. The electrical energy is preferably used to drive the handheld tool.

An electrical connection can be understood to be a connection, preferably in the form of an electrical line or multiple electrical lines conductively contacting each other, or electrically conductive contacts, or in the form of a current-conducting cable for conducting electrical current.

A connection position can be understood to be a position in which the accumulator module is electrically connected to the handheld tool, and the accumulator module is captively supported on the handheld tool via the bearing device.

A removal position can be understood to be a position in which the accumulator module may be removed from the handheld tool, in which, in particular, the accumulator module is no longer connected to the handheld tool, in particular, no longer captively connected. In the removal position, no electrical connection preferably exists between the accumulator module and the handheld tool.

A captive support can be understood to be a support in which the movement of a part to be supported, in particular the accumulator module or the accumulator housing section, is limited in all degrees of freedom and/or essentially prevented or with a clearance tolerated between the parts.

A power tool housing section can be understood to be a housing section of the handheld tool. The power tool housing section is preferably provided with a one-part, two-part, or multi-part design. The power tool housing of a handheld tool encompasses, in particular, an electric motor of the handheld tool, which drives, in particular, a tool spindle of the handheld tool, to which a tool may be or is connected. The accumulator module is used as a power source. The power tool housing section may also form the entire power tool housing.

An accumulator housing section can be understood to be a housing section of the accumulator module. The accumulator housing section is preferably provided with a one-part, two-part, or multi-part design. The accumulator housing section may also form the entire accumulator housing.

At least one bearing element is provided, which may be arranged within at least one recess of the power tool housing section.

The at least one bearing element can be advantageously arranged, in particular captively arranged, within at least one recess of the power tool housing section in the connection position, in particular arranged without clearance. The at least one recess is designed to at least partially, in particular completely, receive the accumulator housing section.

A recess of the power tool housing section can be understood to be a space or a depression within the power tool housing section and/or a space at least partially surrounded or shielded by the power tool housing section. The recess may comprise different regions. A first region is used to receive at least one part of the accumulator housing section. The bearing element may be arranged in a second region of the recess. The recess, or its first and second regions, is dimensioned in such a way that the accumulator housing section is spaced a distance apart from the power tool housing section in the connection position. A direct or, in any case, a reduced contact between the accumulator housing section and the power tool housing section is avoided thereby, whereby an undesirable plastic fusing is prevented.

A polymer is conventionally understood to be a chemical substance, which is made up of macromolecules. The macromolecules are constructed from one or multiple structural units, so-called constitutional repeating units. The polymer substances are classified according to DIN 7724 based on the temperature profile of the shear modulus and the tension set at room temperature. It is based on the mechanical behavior in the service temperature range and the existence of a melting range and is divided, among other things, into thermosetting plastics, elastomers, thermoplastics, and thermoplastic elastomers.

The polymer of the at least one bearing element, also referred to as the first polymer, is preferably a semi-crystalline plastic, in particular of high molecular weight, preferably a thermoplastic plastic. The first polymer preferably has a crystallization degree of more than 60% or 70%, preferable less than or equal to 80%, 85%, or 90%, the crystallization degree preferably being determined by density measurement. The first polymer is preferably polyoxymethylene (POM). Polytetrafluorethylene (PTFE) is also preferred.

Thermoplastic plastics are plastics which may be deformed within a certain temperature range. This process is reversible, i.e., it may be repeated an arbitrary number of times by cooling and reheating up to the molten state, as long as the so-called thermal decomposition of the material does not set in due to overheating. This is what distinguishes thermoplastics from the thermosetting plastics and elastomers.

A crystallization degree within the meaning of the invention is understood to be the portion of a semi-crystalline solid, which is crystalline. In polymers, the crystallization degree depends, among other things, on the thermal past of the material.

The extent of crystallization of a semi-crystalline polymer is dependent on the conditions under which the polymer becomes hard and solidifies. The temperature during solidification and the speed of the temperature change have a decisive influence. The density, glass temperature, melting temperature, and solidity of the plastic increase during the crystallization thereof. As a result, the dimensional stability and resistance to mechanical wear also improve. At the same time, the thermal coefficient of expansion and the penetration capability of liquids and gases decrease.

The most common methods for determining the crystallization degree in polymers are density measurement, DSC, X-ray diffraction, IR spectroscopy, or NMR. In addition to the integral methods mentioned above, the distribution of crystalline and amorphous regions may be visualized by microscopic methods, in particular polarized light microscopy and transmission electron microscopy.

Polyoxymethylenes (POM) are semi-crystalline polymers, which are used, in particular, to manufacture molded parts in injection molding processes. POM is characterized by high strength, hardness, and rigidity within a broad temperature range. It retains its high robustness, has a high abrasion resistance, a low coefficient of friction, a high dimensional stability under heat, good sliding properties, good electric and dielectric properties, as well as a low water absorption. Due to the high stiffness, low friction coefficients, and good dimensional stabilities, polyoxymethylenes are used in the manufacture of precision parts. The low friction coefficients are advantageous in that the frictional heat induced by the oscillation is reduced, whereby an undesirable plastic fusing is prevented. This applies similarly to other suitable materials, such as PTFE.

The at least one bearing element is advantageously a guide strip element, which is designed to guide the accumulator module along an, in particular, linear guiding direction between the connection position and the removal position.

A guide strip element within the meaning of the invention, is understood to be a part which is functionally designed to guide the accumulator housing section between the connection position and the receiving position on the power tool housing section and preferably to space the accumulator housing section and the power tool housing section a distance apart for the purpose of preventing an undesirable plastic fusing of the two section in the connection position.

A guide strip element preferably has an elongated shape and/or has at least one section which has an elongated shape. Elongated (synonymous with oblong) means, in particular, running in a linear manner and means, in particular, that the length of the part exceeds its width and/or height, in particular multiple times. A guide section of this type preferably has at least one surface running in a linear manner, which may be used, in particular, as a sliding surface. Instead of a linear profile, however, a guide section running in a curved manner, in particular curved in a circular manner, may be considered, in particular in sections or in its entirety. A guide strip element may have more than one sliding surface, which may be arranged, in particular, at an angle to each other and/or are opposite each other in parallel, in particular for the purpose of forming a groove. The cross-section of a guide section may be, in particular, essentially L-shaped or essentially U-shaped. A groove-shaped section may be used to fasten the bearing device on the power tool housing section or accumulator housing section, but it may also be used to movably receive an accumulator housing section movably supported on the power tool housing section or be used to movably receive a power tool housing section movably supported on the accumulator housing section.

The at least one bearing element may, however, also be partially or essentially provided with a plate-shaped design and may have, in particular, a plate with integrated guide section, which are used for the relative movement of the power tool housing section and the accumulator housing section.

The bearing device can be provided with a multi-part, in particular two-part, design. The bearing device advantageously includes two or more bearing elements, or the bearing device is manufactured as a single piece. The bearing device may also be present in the form of multiple non-cohesive components, preferably to achieve a multi-point support.

The at least one bearing element is advantageously designed, in particular, as a guide strip element, at least in part, in particular in its entirety, in that it may be arranged along at least one undercut of at least one side surface of the at least one first region of the recess of the power tool housing section. In that the bearing device is connected to the power tool or accumulator housing section, the at least one bearing element is arranged, in particular as the guide strip element, at least partially, in particular completely, along at least one undercut of at least one side surface of the at least one first region of the recess of the power tool or accumulator housing section.

An undercut can be understood to be a region, which is arranged on a housing section in such a way that a part arranged therein is at least partially covered by the housing. In particular, a part arranged in an undercut is protected by the housing during a fall.

The at least one bearing element advantageously comprises a depression and/or a recess for receiving a latching element, in particular a pushbutton latch mounted on the accumulator module. The connection position is, in particular, the position in which the power tool housing section and the accumulator housing section are connected to each other by the latching action of the latching element.

The invention is also directed to a power tool housing section of a handheld tool, comprising a bearing device according to the invention, which is preferably connected to the power tool housing section in a captive and/or immobile manner, in particular connected in a form-fitting and/or materially bonded and/or force-fitting manner. The at least one bearing element is preferably held within a first region of a recess, advantageously within an undercut within the recess, of the power tool housing section in a captive, in particular, form-fitting and/or materially bonded and/or force-fitting manner. The bearing device may also be injection-molded onto the power tool housing section, in particular by multi-component injection molding, in particular overmolding.

The invention therefore also relates to a power tool housing section of a handheld tool, including an interface for detachably connecting a corresponding accumulator housing section or accumulator module to the power tool housing section, and including a bearing device for supporting the accumulator housing section or accumulator module on the interface, the bearing device being, in particular, captively connected to the power tool housing section, The bearing device can include at least one bearing element, which is designed to captively support the accumulator housing section or the accumulator module in a connection position, in which, in particular, the accumulator module is electrically connected to the handheld tool, and to permit the accumulator housing section or accumulator module to be transferred from the connection position into a removal position, in which the accumulator housing section or accumulator module may be removed from the power tool housing section or the handheld tool, characterized in that the at least one bearing element includes a polymer and is arranged between the power tool housing section and the accumulator housing section in the connection position for the purpose of indirectly supporting the accumulator housing section on the power tool housing section and, in particular, to support them at least partially, in particular completely, at a distance from each other.

Form-fitting connections within the meaning of the invention are understood to be connection which arise through the engagement of at least two connecting partners. As a result, the connecting partners may not be detached, even in the case of a mixed form-fitting/force-fitting connection, without the transmission of force or the interruption thereof, in that at least one degree of freedom of movement is limited by this connection, preferably two or more degrees of freedom or all degrees of freedom.

Materially bonded connections within the meaning of the invention are connections in which the connecting partners are held together by atomic or molecular forces. At the same time, they are non-detachable connections, which may be separated only by destroying the connection. A materially bonded connection may be produced, in particular, by welding or gluing.

Furthermore, a force-fitting connection of the at least one bearing element to the power tool housing section or the accumulator housing section is also conceivable.

The power tool housing section advantageously includes a second polymer and the accumulator housing section a third polymer, or essentially made up thereof, which comes, in particular, from the group of polyamides and preferably PA6. PA6 typically has a crystallization degree of 30% to 40%. The second polymer and the third polymer may be identical or different. The second or third polymer preferably has a crystallization degree of less than 50%. The second or third polymer is preferably a different polymer than the first polymer, with which the at least one bearing element is formed. Due to the dissimilarity of the materials, the risk of fusing of the two parts supported against each other is reduced.

Polyamides within the meaning of the invention are understood to be linear polymers with regularly repeating amide bonds along the main chain. The amide group may be conceived of as the condensation product of a carboxylic acid and an amine. The resulting bond is an amide bond, which may be further hydrolytically cleaved.

PA6, or polycaprolactam, is a polymer from the group of polyamides. The plastic is used in mechanical engineering for components under load, among other things, due to their robustness and wear resistance, as well as for high-stress slide bearings and plates, due to their good sliding properties. When pairing the material of two components made from PA6, as with other identical polymer pairs, undesirable bonding may occur during an oscillating relative movement, for example due to plastic fusing.

The power tool housing section and the accumulator housing section can have a material pairing with the bearing element, whose tendency toward fusing is reduced, due to the material properties.

The at least one bearing element can be designed so that it covers or receives a latching element, in particular a pushbutton latch, of the accumulator module in the connection position in such a way that no touching or no contact is possible between the latching element of the accumulator module and the power tool housing section.

A latching element within the meaning of the invention can be a part, which is functionally designed to permit a latching of the accumulator module to the power tool housing and a captive positioning associated therewith. A latching element is typically supported in a movable and spring-mounted manner. The latching element further offers a reversible support and is movable by the user, whereby, for example, a replacement of the accumulator module is made possible.

The invention is also directed to an accumulator housing section of an accumulator module for a handheld tool, which comprises a bearing device according to the invention. The at least one bearing element is held on the accumulator housing section in a captive, in particular, form-fitting and/or materially bonded and/or force-fitting, manner, similarly to the case of the arrangement on the power tool housing section.

The invention is also directed to a handheld tool, in particular a handheld tool with an oscillating driving movement, which comprises a bearing device according to the invention and a power tool housing section and/or an accumulator module comprising an accumulator housing section.

The power tool housing section and the accumulator housing section are supported via the bearing device according to the invention in the connection position, in particular spaced partially, in particular completely, a distance apart.

At least one bearing device may be mounted either on the power tool housing section or the accumulator housing section or on both of these sections.

The invention therefore also relates to a handheld tool, including a power tool housing section; an accumulator housing section or an accumulator module having this accumulator housing section; an interface for detachably connecting the corresponding accumulator housing section or accumulator module to the power tool housing section; and a bearing device for supporting the accumulator housing section or accumulator module on the interface, the bearing device being, in particular, captively connected to the power tool housing section, The accumulator housing section can be arranged in a connection position, in which, in particular, the accumulator module is electrically connected to the handheld tool, in particular detachably and captively connected to the power tool housing section, and is supported on the bearing device;

The bearing device can include at least one bearing element, which captively supports the accumulator housing section or the accumulator module in the connection position, and which permits the accumulator housing section or accumulator module to be transferred from the connection position into a removal position, in which the accumulator housing section or accumulator module may be removed from the power tool housing section or the handheld tool, characterized in that the at least one bearing element includes a polymer and is arranged between the power tool housing section and the accumulator housing section in the connection position for the purpose of indirectly supporting the accumulator housing section on the power tool housing section and, in particular, to support them at least partially, in particular completely, at a distance from each other.

In particular, the handheld tool may be provided with two bearing devices, of which, in particular, a first bearing device may be fixedly connected to the power tool housing section, and a second bearing device may be fixedly connected to the accumulator housing section, the first and second bearing devices preferably supporting each other in the connection position. The first and second bearing devices may be in contact in the connection position.

The first and second bearing devices may not be in contact in the connection position. The first and second bearing devices are preferably spaced in a manner offset from each other in the connection position and therefore are not situated directly opposite each other.

The invention is also directed to a method for manufacturing the bearing device, including at least the steps: providing a first polymer; and manufacturing the at least one bearing element from the first polymer by injection molding, in particular with a crystallization degree of more than 60% or more than 70%.

The invention is also directed to a method for manufacturing a power tool housing section provided with a bearing device according to the invention, including at least the steps: providing the bearing device; and connecting the bearing device to the power tool housing section, in particular by a form fit and/or material bond and/or force fit. The bearing device may also be injection-molded onto the power tool housing section, in particular by means of multi-component injection molding, in particular overmolding.

The invention is also directed to a method for manufacturing an accumulator housing section provided with a bearing device according to the invention, including at least the steps: providing the bearing device; and connecting the bearing device to the accumulator housing section, in particular by a form fit and/or material bond and/or force fit. The bearing device may also be injection-molded onto the accumulator housing section, in particular by means of multi-component injection molding, in particular overmolding.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
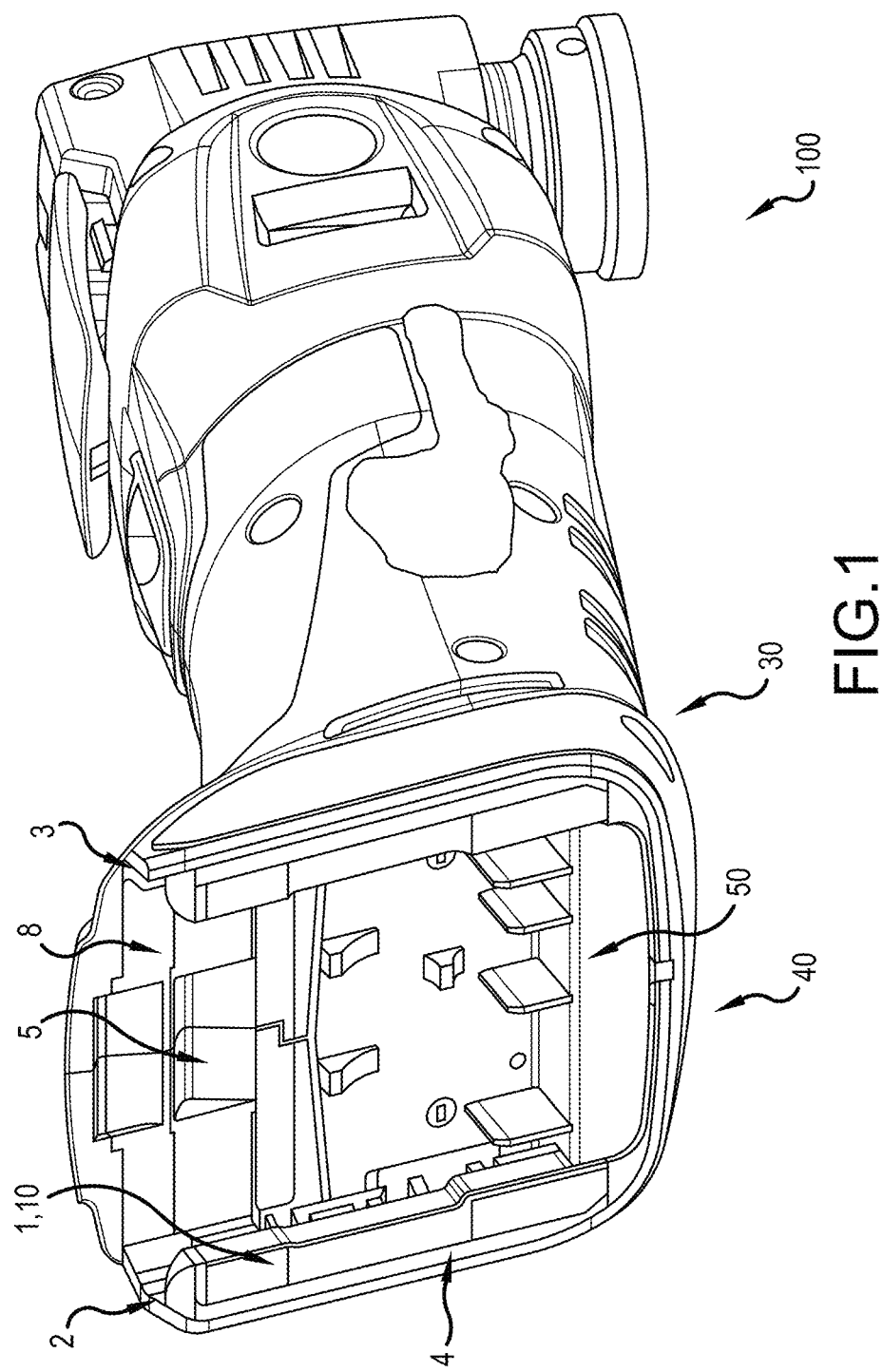
FIG. 1 shows a perspective view of a handheld tool, which includes a bearing device according to the invention according to an exemplary embodiment, illustrated here without the accumulator module.

FIG. 1 shows a handheld tool 100, a multifunction tool in this case, including a tool spindle driven in an oscillating manner, including a bearing device 10 according to the invention for supporting an accumulator module 20 (not illustrated here) on an interface 40 of a power tool housing section 30 of handheld tool 100 and a corresponding accumulator housing section 22 (not illustrated here) of accumulator module 20. Bearing device 10 comprises a bearing element 1, which is designed to captively support accumulator module 20 in a connection position, in which accumulator module 20 is electrically connected to handheld tool 100, and to transfer accumulator module 20 from the connection position into a removal position, in which accumulator module 20 may be removed from handheld tool 100. The material of bearing element 1 comprises a first polymer, POM here, and is arranged between power tool housing section 30 and accumulator housing section 22 in the connection position for the purpose of at least partially, in particular completely, supporting power tool housing section 30 and accumulator housing section 22 at a distance from each other.

Power tool housing section 30 and accumulator housing section 22 are manufactured from a different material than the bearing device, whereby the risk of fusing is reduced. In the exemplary embodiment, PA6 is used for the other material. The oscillating movement present during the use of the handheld tool and friction and heat arising as a result thereof does not produce any disadvantageous effect in the case of the POM/PA6 material pairing; in particular, this material pairing prevents a fusing. The bearing device may therefore also be continuously connected to power tool housing section 30.

Figure 2:
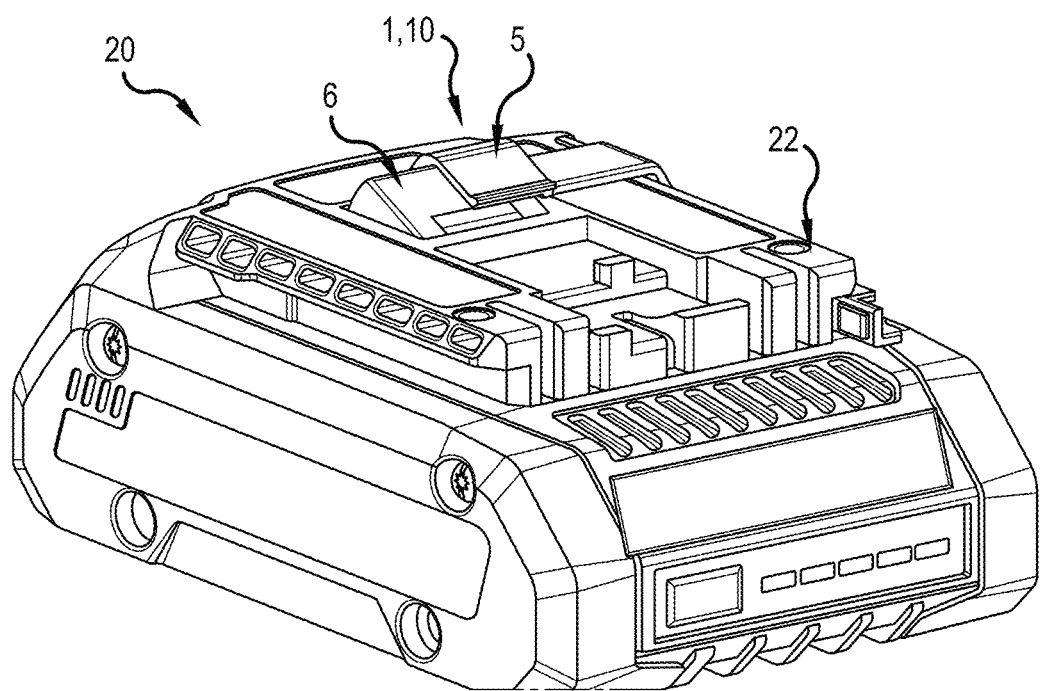
FIG. 2 shows a perspective view of an accumulator module and a detail of the bearing device from FIG. 1.
Figure 6:
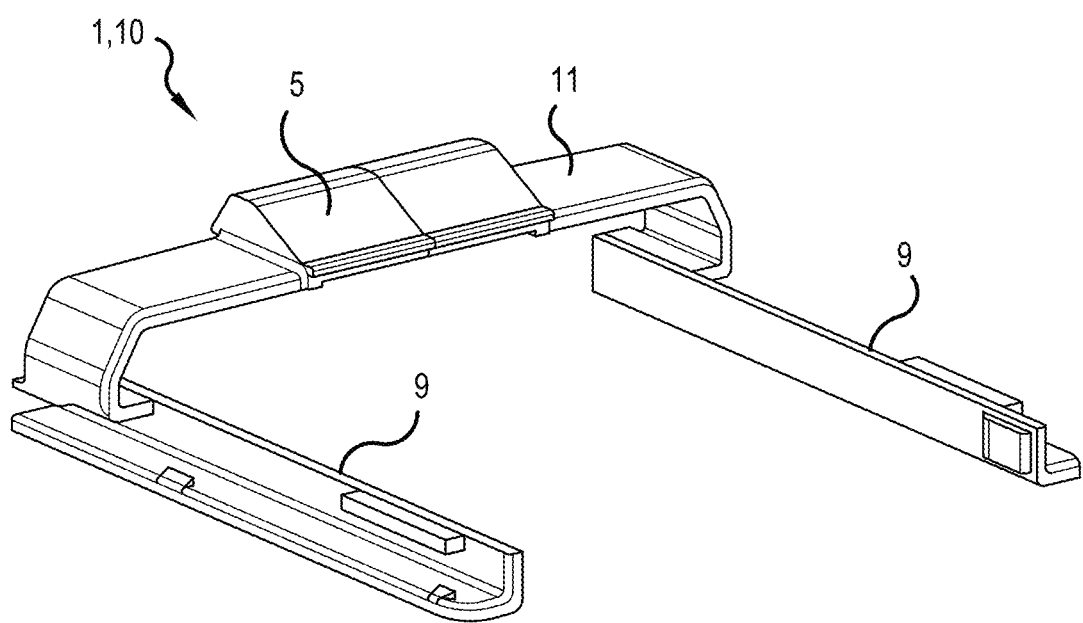
FIG. 6 shows a perspective view of the bearing device.

The at least one bearing element 1 has a depression 5 for receiving a latching element 6, in particular a pushbutton latch mounted on accumulator module 20 (shown in FIG. 2). Bearing element 1 has the function of a guide strip element, which is designed to be arranged at least partially, in particular completely, along at least one first region 2 of a recess 50 of power tool housing section 30. First region 2 is used to receive at least one part of accumulator housing section 22. Bearing element 1 is also arranged in at least one second region 8 of the recess 50 of the power tool housing section 30 (see portion of bearing element 1 having the depression 5). The first and second regions are dimensioned in such a way that accumulator housing section 22 is spaced a distance apart from power tool housing section 30 in the connection position. A direct contact or, in any case, a reduced contact between accumulator housing section 22 and power tool housing section 30 is avoided thereby, whereby an undesirable plastic fusing is prevented. First region 2 of recess 50 may be provided in the form of a groove and/or an undercut 3, in which bearing element 1 is arranged with at least one side surface 4, preferably in a form-fitting manner. The bearing element 1 is depicted, on its own, in FIG. 6. As shown. the bearing element 1 has two guiding sections 9 of elongated shape, and a portion 11 that includes the depression 5. The two guiding sections 9 form linear sliding surfaces for a linear guiding action.

First region 2 of recess 50 is dimensioned in such a way that accumulator housing section 22 is spaced a distance apart from power tool housing section 30 by bearing element 1 arranged in first region 2 of recess 50. No direct contact thus exists between accumulator housing section 22 and power tool housing section 30, whereby an undesirable plastic fusing of the two sections is prevented. First region 2 of recess 50 and, in particular, undercut 3 situated therein, are further used to protect bearing element 1 against mechanical influences, which may occur, for example, if handheld tool 100 is dropped.

Figure 3:
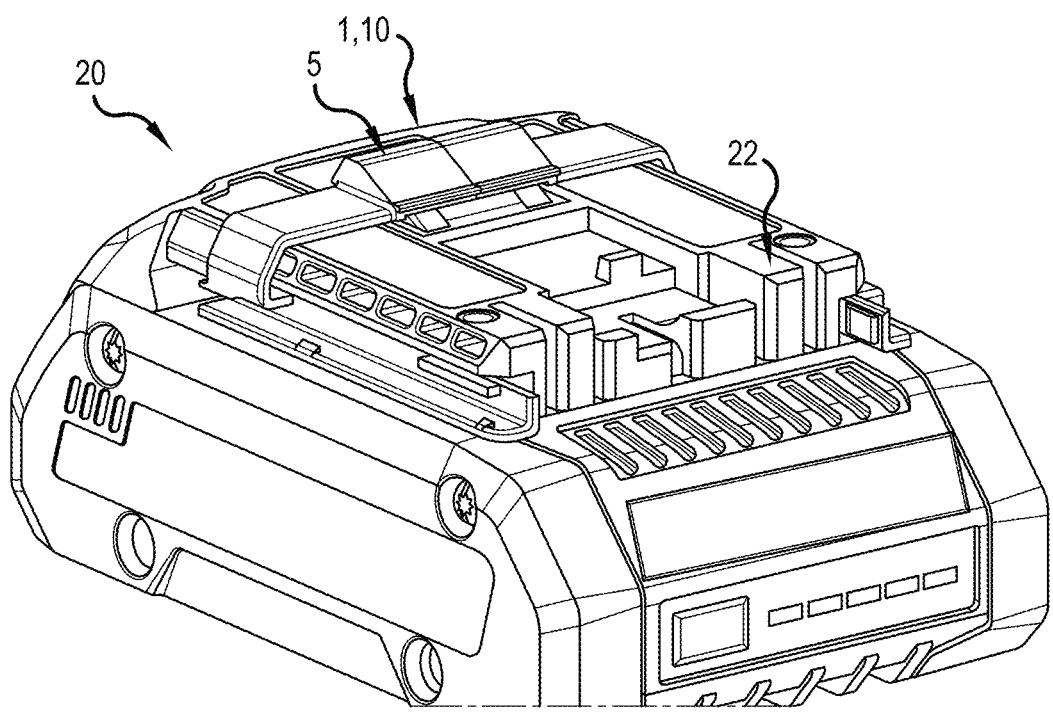
FIG. 3 shows a further perspective view, including the bearing device from FIGS. 1 and 2.

FIG. 2 shows one part of a two-piece bearing element 1, which is designed to be arranged within at least first region 2 of recess 50 of power tool housing section 30, the at least one recess 50 being designed to at least partially, in particular completely, receive accumulator housing section 22. The at least one bearing element 1 is designed as a guide strip element, which is designed to guide accumulator module 20 along a guiding direction between the connection position and the removal position. Bearing device 10 is provided with a two-part design, only one part being illustrated in FIG. 2 and thus the latching element 6 of the accumulator module 20 is visible here. This is used to simplify the mounting of bearing device 10 on power tool housing section 30. In principle, the two parts of bearing element 1 may also be integrally connected. The two parts, which touch each other when they are connected to the housing section, form a bearing element through their interaction. Each of these two parts may, however, also be understood separately as bearing element 1. Bearing device 10 may be mounted on accumulator housing section 22 (as shown in FIGS. 2 and 3) or on power tool housing section 30 (as shown in FIG. 1).

Accumulator housing section 22 is made from PA6 in the exemplary embodiment, while bearing element 1 in the exemplary embodiment is made from polyoxymethylene, POM. The low friction coefficient of POM is advantageous in that the effect of the friction and heat resulting from the oscillation is reduced, whereby a plastic fusing of bearing device 10 with accumulator housing section 22 is prevented.

Bearing element 1 is designed as a guide strip element, which is designed to guide accumulator module 20 along a guiding direction between the connection position and the removal position.

Whereas FIG. 2 shows merely one part of the two-piece bearing element 1. FIG. 3 shows the two parts of the two-piece bearing element 1 from FIG. 1. Bearing element 1 or the guide strip element will be arranged completely along undercuts 3 of at least one side surface 4 of the at least one first region 2 of recess 50 of power tool housing section 30, as shown in FIG. 1. Bearing element 1 has a depression 5 for receiving a latching element 6, in particular a pushbutton latch mounted on accumulator module 20.

Figure 4:
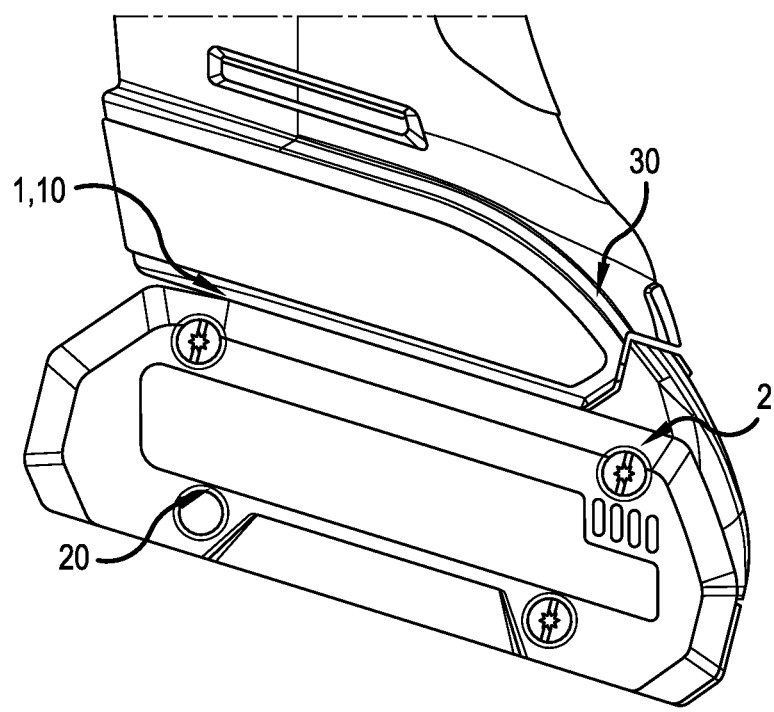
FIG. 4 shows a perspective view of the handheld tool, comprising the bearing device from FIG. 1, FIG. 2, and FIG. 3, including the accumulator module in the connection position.

FIG. 4 shows a handheld tool 100, in particular a handheld tool having an oscillating driving movement. The handheld tool comprises a bearing device 10, including a bearing element 1, a power tool housing section 30, and an accumulator module 20, which comprises an accumulator housing section 22. Power tool housing section 30 and accumulator housing section 22 are spaced a distance apart by bearing element 1, whereby an undesirable plastic fusing is prevented during an oscillating driving movement, in that the contact between accumulator housing section 22 and power tool housing section 30 is prevented by bearing element 1.

Figure 5:
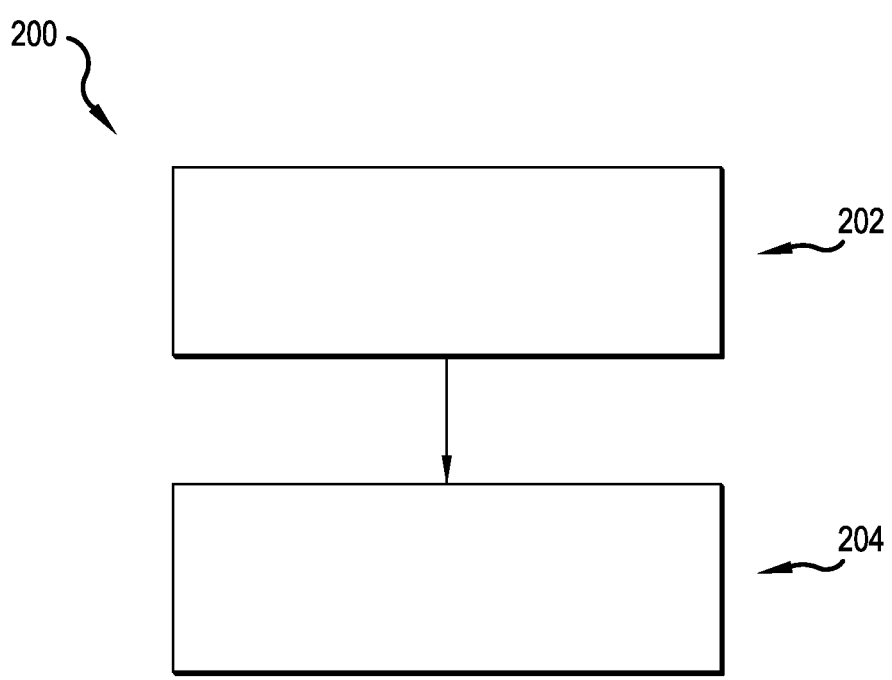
FIG. 5 shows a flow chart of a method according to the invention.

FIG. 5 shows a flow chart of a method 200 for manufacturing bearing device 10, including at least the steps: providing 202 a first polymer; and manufacturing 204 the at least one bearing element from the first polymer by injection molding, in particular with a crystallization degree of more than 60%.

The first polymer is preferably present in the form of granulated plastic. After the polymerization and possible compounding, the first polymer is initially present in the extruder as a molten mass. The latter is now formed into strands via nozzles and cooled in air or water. A rotating blade subsequently cuts the strands in to section of a few millimeters in length, which are referred to as granulated material.

During injection molding, the first polymer is liquefied (plasticized) with the aid of an injection molding machine and injected into a mold, the injection molding die, under pressure. In the die, the first polymer transitions back into the solid state by means of cooling or a cross-linking reaction. The hollow space, cavity, of the die determines the shape and surface structure of a bearing element 1 of a bearing device 10.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A bearing device to support an accumulator module on an interface of a power tool housing section of a handheld tool and a corresponding accumulator housing section of the accumulator module, the bearing device comprising:
   at least one bearing element arranged to captively support the accumulator module in a connection position, in which the accumulator module is electrically connected to the handheld tool and facilitate a transfer of the accumulator module from the connection position into a removal position, in which the accumulator module is removed from the handheld tool,
   wherein the at least one bearing element is formed of a first polymer and is arranged between the power tool housing section and the accumulator housing section in the connection position to support the power tool housing section and the accumulator housing section,
   wherein the at least one bearing element supports the accumulator housing section and the power tool housing section, such that the accumulator housing section and the power tool housing section are completely spaced apart from one another,
   wherein the at least one bearing element is arranged within at least one first region of a recess of the power tool housing section,
   wherein the recess of the power tool housing section comprises a second region, the accumulator housing section being at least partially or completely received within the second region of the recess, and
   wherein the at least one bearing element has a body portion that extends in a first direction, each end of the body portion having an elongated guiding section extending therefrom in a second direction that is perpendicular to the first direction, each of the elongated guiding sections forming a linear sliding surface to linearly guide the accumulator module into the connection position and from the connection position to the removal position.

2. The bearing device according to claim 1, wherein the first polymer is a semi-crystalline thermoplastic plastic of high molecular weight having a degree of crystallization of more than 70% or polyoxymethylene.

3. The bearing device according to claim 1, wherein the at least one bearing element is formed of two parts or the at least one bearing element is manufactured as a single piece.

4. The bearing device according to claim 1, wherein the at least one bearing element is designed as a guide strip element for the purpose of being arranged at least partially or completely along at least one undercut provided at a side surface in the at least one first region of the recess of the power tool housing section.

5. The bearing device according to claim 1, wherein the at least one bearing element has a depression for receiving a latching element mounted on the accumulator module, wherein the latching element is a pushbutton.

6. A power tool housing section of a handheld tool, comprising:
   the bearing device according to claim 1, wherein the at least one bearing element is captively connected to the power tool housing section in a form-fitting manner and/or materially bonded and/or force-fitting manner, and the at least one bearing element is arranged within the at least one first region of the recess of the power tool housing section and the accumulator housing section is at least partially or completely received within the second region of the recess of the power tool housing section.

7. The power tool housing section according to claim 6, wherein the power tool housing section is formed of a second polymer, wherein the second polymer is a semi-crystalline polymer or has a crystallization degree of less than 50%.

8. The power tool housing section according to claim 6, wherein the at least one bearing element covers a latching element of the accumulator module in such a way that the latching element does not have contact with the power tool housing section, wherein the latching element is a pushbutton.

9. An accumulator housing section of an accumulator module for a handheld tool, comprising:
the bearing device according to claim 1, wherein the at least one bearing element is captively connected to the accumulator housing section in a form-fitting manner and/or materially bonded and/or force-fitting manner.

10. The accumulator housing section according to claim 9, wherein the accumulator housing section is formed of a second polymer, wherein the second polymer is a semi-crystalline polymer or has a crystallization degree of less than 50%.

11. The accumulator housing section according to claim 9, wherein the at least one bearing element covers a latching element of the accumulator module in such a way that the latching element does not have contact with the power tool housing section in a connection position, in which the accumulator module is connected to the handheld tool, wherein the latching element is a pushbutton.

12. A handheld tool, comprising:
the bearing device according to claim 1;
the power tool housing section and the accumulator module which comprises the accumulator housing section,
wherein the power tool housing section and the accumulator housing section are supported indirectly against each other via the bearing device in the connection position, such that the power tool housing section and the accumulator housing section are completely spaced apart from one another.

13. A method for manufacturing the bearing device according to claim 1, the method comprising:
providing the first polymer; and
manufacturing the at least one bearing element from the first polymer by injection molding, to configure the at least one bearing element to support the accumulator housing section and the power tool housing section, such that the accumulator housing section and the power tool housing section are completely spaced apart from one another, with the at least one bearing element being arranged within the at least one first region of the recess of the power tool housing section and the accumulator housing section being at least partially or completely received within the second region of the recess, and to configure the at least one bearing element to have the body portion that extends in the first direction, with each end of the body portion having the elongated guiding section extending therefrom in the second direction that is perpendicular to the first direction, so that each of the elongated guiding sections forming the linear sliding surface to linearly guide the accumulator module into the connection position and from the connection position to the removal position.

14. The power tool housing section according to claim 7, wherein the second polymer is polycaprolactam, PA6.

15. The accumulator housing section according to claim 10, wherein the second polymer is polycaprolactam, PA6.

16. The bearing device according to claim 1, wherein the at least one bearing element is discrete from the power tool housing section and the accumulator housing section.

17. The bearing device according to claim 5, wherein the body portion of the at least one bearing element is formed of two parts, each of the two parts having the elongated guiding section extending therefrom and each of the two parts having the depression thereon.

18. The bearing device according to claim 17, wherein the depression of each of the two parts of the body portion are arranged so as to be adjacent one another.

* * * * *